US012643454B2

(12) United States Patent     (10) Patent No.:    US 12,643,454 B2

Vähä-Piikkiö et al.        (45) Date of Patent:      Jun. 2, 2026

(54) WORKING EQUIPMENT WITH A LIFT FRAME ASSEMBLY WITH ALIGNMENT CAPABILITIES

(71) Applicant: Hiab AB, Malmö (SE)

(72) Inventors: Ville Vähä-Piikkiö, Rusko (FI); Mikko Nyström, Rusko (FI); Tommi Mattila, Paimio (FI); Pasi Sirén, Kirjala (FI)

(73) Assignee: HIAB AB, Malmo (SE)

( * ) Notice: Subject to any disclaimer, the term of this patent is extended or adjusted under 35 U.S.C. 154(b) by 413 days.

(21) Appl. No.: 18/539,408

(22) Filed: Dec. 14, 2023

(65) Prior Publication Data

US 2024/0208392 A1     Jun. 27, 2024

(30) Foreign Application Priority Data

Dec. 21, 2022    (EP) ..................................... 22215297

(51) Int. Cl.
     *B60P 1/64*        (2006.01)
(52) U.S. Cl.
     CPC ............. *B60P 1/6463* (2013.01); *B60P 1/649* (2013.01)
(58) Field of Classification Search
     CPC ....... B60P 1/483; B60P 1/6427; B60P 1/6463; B60P 1/649; B65D 88/129; B65D 88/121; B65D 90/0033; B66F 3/24; B66F 7/20
     USPC ....... 414/498, 546, 491, 555, 477, 542, 458; 254/89 H, 423; 269/55
     See application file for complete search history.

(56) References Cited

U.S. PATENT DOCUMENTS 3,559,863 A   *   2/1971   Sack ........................ B27M 3/18
                                             227/111
3,749,363 A   *   7/1973   Hauser .................. B60P 1/6427
                                             414/498
4,325,666 A   *   4/1982   Chain .................. A01D 87/127
                                             414/785

(Continued)

FOREIGN PATENT DOCUMENTS

CN      202264684 U     6/2012
EP       3802212 A1     4/2021

(Continued)

OTHER PUBLICATIONS

Extended European Search Report issued for priority European Application No. 22215297.7, issued Jun. 12, 2023.

*Primary Examiner* — Gregory W Adams

(74) *Attorney, Agent, or Firm* — Renner, Otto, Boisselle & Sklar, LLP

(57) ABSTRACT

A working equipment including a movable arm. A lift frame assembly includes a lift frame with an attachment part to be attached to a second end of the movable arm, a pair of upper connectors at opposite sides of an upper part, and a pair of lower connectors at opposite sides of a lower part, adapted to attach the upper and lower parts to upper and lower parts, respectively, of a load carrying object. The lift frame assembly includes a set of pivotable guiding structures at opposite sides thereof. A control unit generates an alignment control signal to move the guiding structures from retracted positions into closed positions where the guiding structures are in contact with side surfaces of the load carrying object During movement of the guiding structures, the lift frame are forced to be pivoted to be aligned to the side surfaces of the load carrying object.

10 Claims, 3 Drawing Sheets

(56) References Cited

U.S. PATENT DOCUMENTS

| | | | | | |
|---|---|---|---|---|---|
| 4,778,327 | A | * | 10/1988 | Tufenkian | B66F 9/06 |
| | | | | | 414/471 |
| 5,427,495 | A | * | 6/1995 | Vlaanderen | B60P 1/483 |
| | | | | | 414/667 |
| 6,830,422 | B2 | * | 12/2004 | Whitley | B60P 3/40 |
| | | | | | 414/458 |
| 7,637,499 | B2 | * | 12/2009 | Kawashima | B65H 9/166 |
| | | | | | 271/238 |
| 8,061,955 | B2 | * | 11/2011 | McIntosh | B60P 1/483 |
| | | | | | 414/546 |
| 8,414,245 | B2 | * | 4/2013 | Johnson | B60P 1/6427 |
| | | | | | 414/549 |
| 9,004,454 | B1 | * | 4/2015 | Faure | B65D 90/0033 |
| | | | | | 254/93 L |
| 10,538,399 | B2 | * | 1/2020 | Downing | B60P 1/6463 |
| 2007/0264109 | A1 | * | 11/2007 | Curtis | B60P 1/6463 |
| | | | | | 414/447 |
| 2021/0237637 | A1 | * | 8/2021 | Höjner | B60P 1/6481 |

FOREIGN PATENT DOCUMENTS

| | | | |
|---|---|---|---|
| EP | 3894273 | A1 | 10/2021 |
| EP | 3838666 | B1 | 8/2022 |
| FR | 2750088 | A1 | 12/1997 |
| GB | 2298856 | A | 9/1996 |
| JP | 2020104768 | A | 7/2020 |
| WO | 2021255345 | A1 | 12/2021 |

* cited by examiner

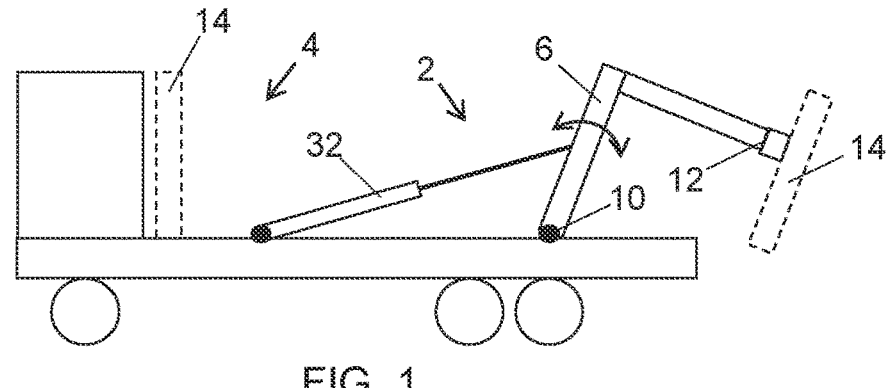
FIG. 1
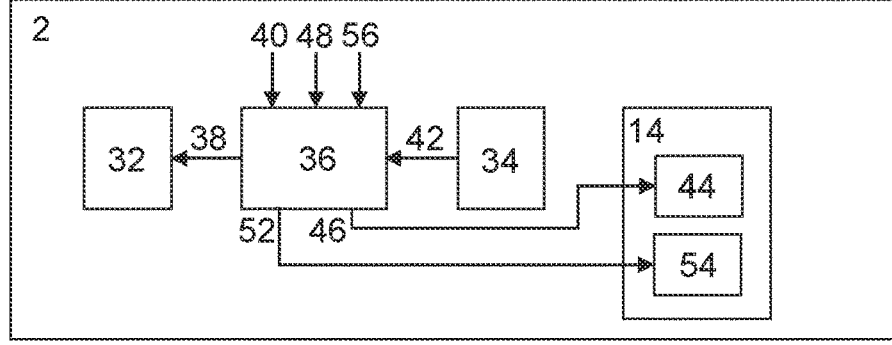
FIG. 2
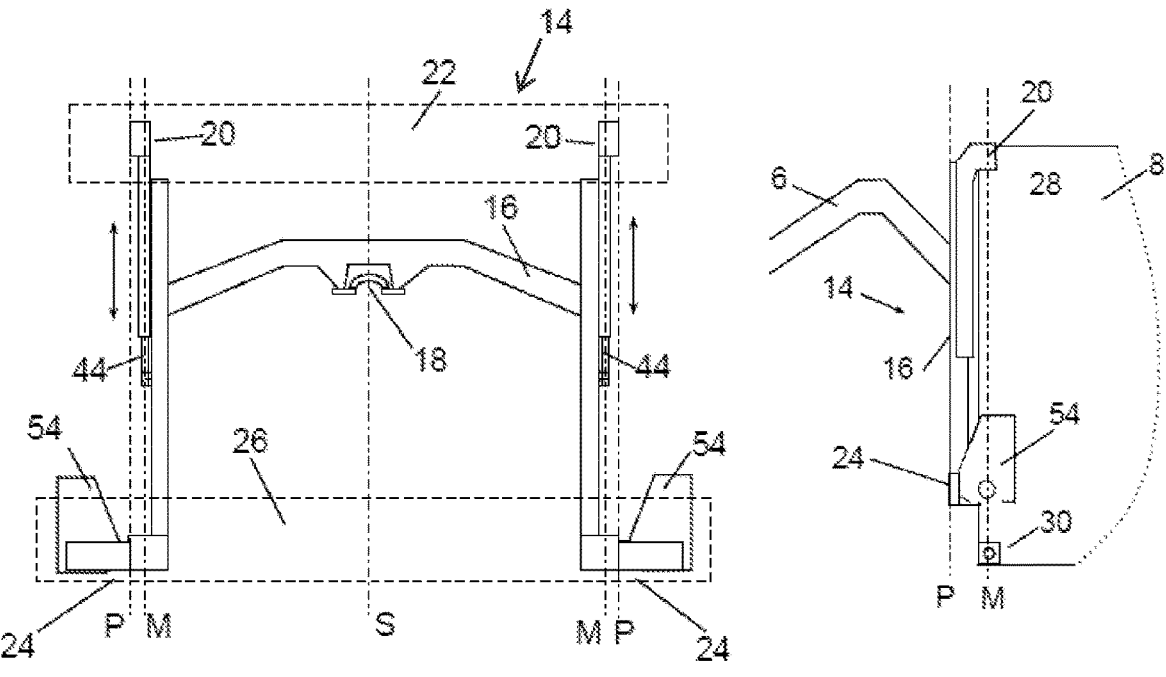
FIG. 3                                    FIG. 4

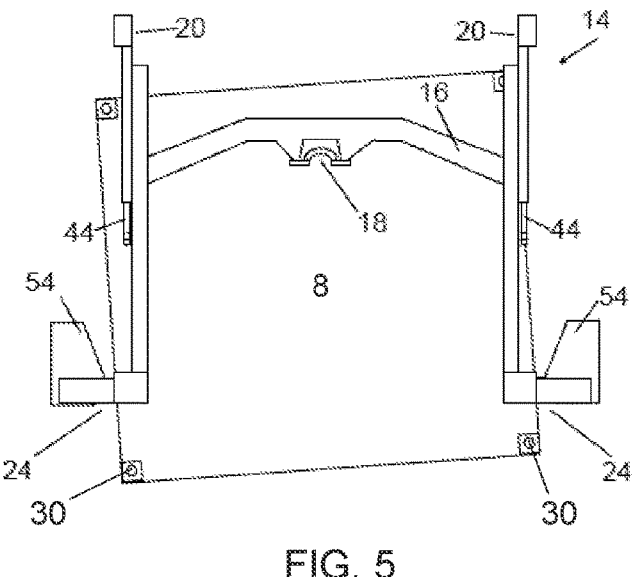
FIG. 5
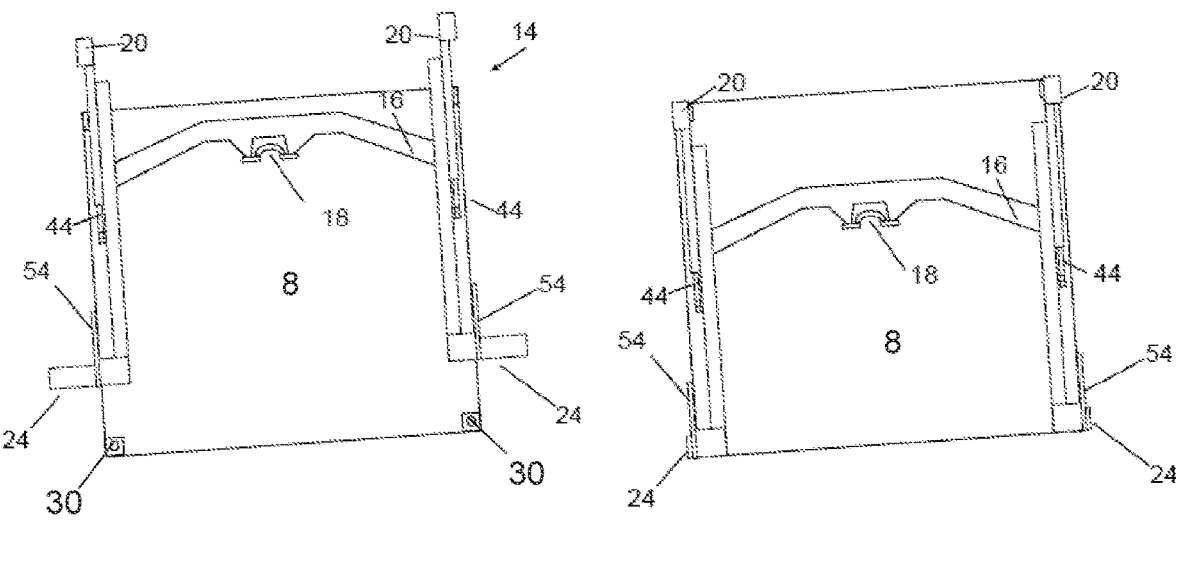
FIG. 6                    FIG. 7

WORKING EQUIPMENT WITH A LIFT FRAME ASSEMBLY WITH ALIGNMENT CAPABILITIES

This application claims priority to European Patent Application No. 22215297.7, filed Dec. 21, 2022, which is hereby incorporated herein by reference in its entirety.

TECHNICAL FIELD

The present disclosure relates to a working equipment comprising a movable arm for loading and unloading a load carrying object, such as a container, to/from the vehicle. The movable arm has a first end connected to the vehicle and a second end arranged to connect the movable arm to the load carrying object during the loading or unloading by using a lift frame assembly to be releasably attached to the movable arm. The frame may also be firmly attached to the movable arm.

BACKGROUND

The present disclosure relates to the field of lift frames for load carrying objects, such as containers, in particular lift frames adapted to cooperate with front holes of ISO containers.

A container is conventionally in the form of a parallelepiped box, intended for transporting goods. ISO standard defines standards for containers, in particular of dimensions (length, width, height), mass, or configurations (disposition of orifices allowing the container to be gripped, etc.). Due to standardization of the containers, the ISO standard facilitates handling thereof. For the purpose of transporting goods, the ISO container has to be moved and lifted, for loading and unloading on various vehicles, for example trucks or boats.

Handling of an ISO container, for example in port installations, is conventionally carried out by means of a container lifting system using container spreaders engaging in orifices in the four corners of the upper face of the container, the upper face being the face opposite the face placed on the ground. The container spreader then locks to the container, for example by means of rotating locks. This type of container lifting system with spreaders may be used to load or unload the container to or from a vehicle. Handling of an ISO container can also be carried out by means of a lifting system engaging in orifices formed in the four corners of a vertical front face or rear face of the container, the front and opposite rear face (or wall) corresponding to a face of smaller dimensions of the container. For clarity it may be noted that the vertical walls with a longer horizontal dimensions are often referred to as side walls.

Load-handling vehicles are trucks which are conceived as carrier vehicles for transporting load carrying objects such as containers. Examples of such load-handling vehicles are roll-on/roll-off dump trucks or hook-lift trucks. Load-handling vehicles may hence be equipped with a working equipment comprising a loading arm assembly to be able to load and unload a container to or from the vehicle by itself.

Furthermore, there are loading arm assemblies which can receive a so-called ISO container. ISO standard 668 forms the respective standard for said ISO containers. The ISO standard 668 comprises among other 1C, 1CC and 1CX containers, each having different heights. The ISO containers are gripped by the corners, and a correspondingly configured loading arm assembly has at least two corner grippers, wherein the corner grippers can grip the ISO container at the corners.

In known solutions, such as for a hook-lift, a loading arm assembly may have a main arm, wherein the main arm is disposed so as to be pivotable on the vehicle chassis. In turn, an auxiliary arm, configured so as to be elbow-shaped, is disposed on the main arm. The auxiliary arm may be disposed on the main arm by an articulated joint, a telescopic arrangement or a fixed mounting. Often a gripping hook is configured on the free end of the articulated arm. A lift frame having four corner grippers can be attached to the elbow-shaped region of the articulated arm, so as to thus be able to also load and unload ISO containers. The lift frame when not in use can be unloaded onto the load-handling vehicle behind the cab.

It has furthermore been demonstrated that gripping ISO containers is not always possible by way of four corner grippers, where e.g. the lower front corners of the container can, in certain conditions, be difficult to access. For example, such load-handling vehicles are also used for defense applications, wherein ISO containers or the transportation containers having hooks do not always stand on a flat solid ground but on rough terrain. There is the problem herein that the ISO containers can sink into soft ground and the lower corners of the ISO container if at all can thus only be reached with difficulty. This situation may occur, for example, in cold or wet countries, where the lower front corners of the container may be covered, for example, with snow, ice, or with mud. It is then not possible to attach the lower pins of a lift frame to the lower orifices of the container without first releasing the container, by cleaning its lower part or even by digging the ground. The container may also be in a tilted position in relation to the vehicle. In all such uses there is furthermore the problem that the operator of the load-handling vehicle can be exposed to danger when he/she gets out of the vehicle.

Thus, in the case where the lower corners of a container are difficult to access, the lift frame cannot lift or move the container without previously clearing the lower corners of the container. Such a clearance may prove to be lengthy and laborious, or even impossible.

Related prior art documents are identified below and briefly discussed. EP3894273 relates to a loading arm arrangement for a swap body vehicle with a main arm, with an auxiliary arm and with a gripping hook. The loading arm arrangement is designed for unloading and loading transport containers with a hook, wherein a pivoting arm part is arranged pivotably on the auxiliary arm via a joint. A gripping hook is arranged pivotably on the pivoting arm part.

EP3802212 relates to a loading arm assembly for a load-handling vehicle, having a main arm and having an auxiliary arm. The loading arm assembly is configured for unloading and loading ISO containers and for unloading and loading transportation containers having a hook and is provided with a crossbeam having two corner grippers.

GB2298856 relates to an adapter structured to be attached to a hook lift and intended to be used for loading and unloading an ISO container.

EP3838666 relates to a lifting support for a container, comprising two upper pins and two lower pins, adapted to be inserted into complementary holes of the container when the lifting support is in a first position vis-à-vis the container. The lifting support is also provided with two intermediate pins, positioned between the two upper pins and the two lower pins, and adapted to be inserted into two complementary upper holes of the container when the lifting support is in a second position vis-à-vis the container.

WO2021255345 relates to a loading arrangement for loading and unloading load units, e.g. a container, on and/or off a vehicle, such as a truck.

The object of the present invention is to achieve an improved working equipment provided with a lift frame assembly capable of handling various situations related to attaching and loading a load carrying object to a vehicle. The working equipment according to the present invention is particularly applicable in situations where the lift frame is not correctly oriented in relation to the load carrying object to be attached. And more particularly, the lift frame must be aligned with side surfaces of the load carrying object when the lift frame approaches the load carrying object, which is necessary for attaching the lift frame to the load carrying object. The alignment procedure requires high accuracy, and today often human intervention, i.e. the operator needs to leave the cab to manually interact during the alignment procedure.

SUMMARY

The above-mentioned object is achieved by the present invention according to the independent claim.

Preferred embodiments are set forth in the dependent claims.

A working equipment comprising a conventional hooklift may be applied to implement the present invention. The driver can then choose to do the loading of e.g. a flatrack in the usual way with the hook, or to hook on the lift frame to load e.g. a container by using the lift frame. When the lift frame is not in use, it may be parked e.g. farthest towards the cab of the truck. In another implementation the lift frame assembly may be permanently attached to the movable arm of the hooklift.

The working equipment according to the present invention, provides an improved lift frame that enables the driver/operator to remain in the cab during loading. This is important in e.g. military applications, and is also a prereq-uisite for semi-autonomous or autonomous solutions where load carrying objects are loaded with remote confirmation and/or supervision of an operator, e.g. sitting in the vehicle cab or at another location, or a fully autonomous loading solution without the need of human confirmation or super-vision.

An important aspect of the present invention is that the lift frame assembly comprises a set of pivotable guiding struc-tures arranged at opposite sides of the lift frame. The guiding structures are pivotable about pivoting axes P, and during a lift frame alignment procedure, the guiding structures are moved from retracted positions into closed positions where the guiding structures are in contact with side surfaces of the load carrying object. During movement of the guiding structures from the retracted positions into the closed posi-tions, the lift frame is forced to be pivoted in order to be aligned to the side surfaces of the load carrying object.

This is advantageous, as the lift frame may be aligned to the load carrying object with no manual intervention. Also, during an attachment procedure, when the lift frame is to be attached to the load carrying object, the guiding structures will keep the lift frame in a position to perform the attach-ment.

Thus, operation with prior art designs very often requires some manual labour outside the truck to help the lift frame position to be in a correct position for being attached to the load carrying object. The alignment procedure described herein significantly decreases the need for any manual intervention and makes it possible to be applied without the operator leaving the cabin. Further, enabling loading of containers from non-optimal positions where they e.g. are tilted compared to the horizontal plane is a presumption to implement autonomous functions with practical applicabil-ity.

BRIEF DESCRIPTION OF THE DRAWINGS

FIG. 1 is a schematic illustration of a vehicle provided with working equipment according to the present invention.

FIG. 2 is a block diagram of the working equipment according to the present invention.

FIG. 3 is a front view of an embodiment of the lift frame assembly according to the present invention.

FIG. 4 is a side view of an embodiment of the lift frame assembly according to the present invention.

FIGS. 5-7 are front views of an embodiment of the lift frame assembly according to the present invention illustrat-ing an alignment procedure followed by an attachment procedure of a tilted load carrying object.

DETAILED DESCRIPTION

Figure 8:
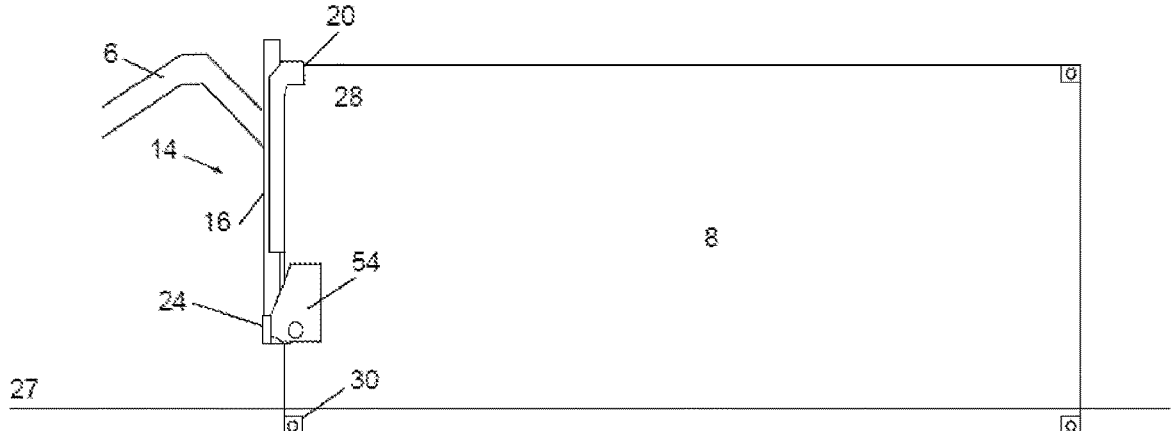
FIGS. 8 and 9 are side views of an embodiment of the lift frame assembly according to the present invention illustrat-ing an attachment procedure of a load carrying object where a lower part of the load carrying object is inaccessible.

The working equipment will now be described in detail with references to the appended figures. Throughout the figures the same, or similar, items have the same reference signs. Moreover, the items and the figures are not necessarily to scale, emphasis instead being placed upon illustrating the principles of the invention.

With references to FIGS. 1-4, the working equipment 2, arranged to be mounted to a vehicle 4, will now be described in detail. The working equipment comprises a movable arm 6 for loading and unloading a load carrying object 8, such as a container, to/from the vehicle. The movable arm 6 has a first end 10 connected to the vehicle and a second end 12 arranged to connect the movable arm 6 to the load carrying object 8 during the loading or unloading. The movable arm may for example form part of a hook-lift assembly or a crane assembly.

The working equipment further comprises a lift frame assembly 14 comprising a lift frame 16 with an attachment part 18 arranged to be attached to the second end 12 of the movable arm 6, a pair of upper connectors 20 mounted at opposite sides of an upper part 22 of the lift frame 16, and a pair of lower connectors 24 mounted at opposite sides of a lower part 26 of the lift frame 16. The attachment part 18 may be in the shape of a bar adapted to engage with a hook at the second end 12 of the movable arm 6, this type of attachment provides a releasable connection between the parts that further allows for the lift frame assembly to pivot around the connection point. This type of attachment may further allow the lift frame assembly to be horizontally aligned when it is free-hanging at the hook. Other alterna-tives for attachment part 18 and the second end 12 are further possible that would provide a similar releasable and pivoting connection. As yet another alternative a non-releas-able and pivoting attachment between the attachment part 18 and the second end 12 may be provided.

The pairs of upper and lower connectors 20, 24 are adapted to attach the upper and lower parts 22, 26 of the lift frame 16 to a corresponding upper part 28 and lower part 30, respectively, of the load carrying object 8. As discussed in the background section the upper and lower parts of the load carrying object are provided with openings/orifices according to a specified standard, where the connectors of the lift frame will attach and lock in order to perform a loading/unloading procedure.

The upper connectors 20, and the lower connectors 24, are conventional, hydraulically or electrically, actuated connectors that are remotely operable, and thereby the operator does not need to get out of the cabin during this operation.

In addition, the working equipment is provided with an actuator system 32, arranged to operate movements of the working equipment 2. Preferably, the actuator system 32 comprises a pair of hydraulic cylinders or electrical actuators which is schematically illustrated in FIG. 1.

The working equipment is also provided with a sensor system 34, arranged to monitor the movements of the working equipment 2, and a control unit 36 configured to generate control instructions 38 to control the operation of the actuator system 32 in response to a loading/unloading command 40 for the loading and/or unloading of the load carrying object 8 and sensor signals 42 received from the sensor system 34. The sensor signals 42 include one or many of image signals, distance signals, and movement signals.

The lift frame assembly 14 may optionally comprise a set of actuators 44 configured to change the positions of the upper connectors 20 relative to the attachment part 18 along parallel movement axes M close to the opposite sides of the lift frame 16, and parallel to a symmetry axis S of the lift frame 16. The symmetry axis S is parallel to the opposite sides of the lift frame 16 and is in a plane defined by the upper and lower parts 22, 26 of the lift frame 16. This is clearly illustrated in FIGS. 3 and 4.

The set of actuators 44 are preferably hydraulic cylinders or electrical actuators, which is schematically shown in FIG. 3. The actuators 44 are capable of providing enough hydraulic force to lift a front end of a fully loaded load carrying object 8 using these cylinders alone. Hoses for a possible hydraulic system and/or electrical cables for electric actuators and/or sensors may be guided from the vehicle to the lift frame assembly via the movable arm.

In one alternative embodiment of the present invention comprising the set of actuators 44 configured to change the positions of the upper connectors 20 relative to the attachment part 18 along parallel movement axes M, the working equipment is configured to perform an attachment procedure, i.e. a procedure for attaching the lift frame to the load carrying object. According to this embodiment, the control unit 36 is further configured to generate instructions 46 to control the set of actuators 44 to change the positions of the upper connectors 20 along the movement axes M during an attachment procedure for attaching the lift frame 16 to the load carrying object 8 in response of an attachment command 48, and sensor signals 42 from the sensor system 34. The instructions 46 may then include instructions to change the positions of the upper connectors 20, and/or also instructions to perform the actual attachments of the connectors to the load carrying object during an attachment procedure.

The set of actuators 44 are preferably provided with position sensors, which are applied to adjust the distance between upper and lower connectors to correspond to the dimension of the load carrying object.

According to the present invention, the lift frame assembly 14 comprises a set of pivotable guiding structures 54 arranged at opposite sides of the lift frame 16. The guiding structures 54 are pivotable about pivoting axes P close to the opposite sides of the lift frame 16, and parallel to a symmetry axis S of the lift frame 16. The pivoting axes are clearly seen in FIGS. 3 and 4. As also shown in the FIGS. 3 and 4, the symmetry axis S is parallel to the opposite sides of the lift frame 16 and in a plane defined by the upper and lower parts 22, 26 of the lift frame 16. Preferably, the pivoting axes P are parallel to a symmetry axis S of the lift frame 16.

The control unit 36 is further configured, during a lift frame alignment procedure, to generate an alignment control signal 52 provided with control instructions to move the guiding structures 54 from retracted positions into closed positions where the guiding structures 54 are in contact with vertical side surfaces of the load carrying object 8. The movement of the guiding structures 54 are operated by a set of actuators, that may form part of a system of actuators at the lift frame assembly 14. This set of actuators are operating the movement of the guiding structures 54 in response to the alignment control signal 52. These actuators may be hydraulic actuators or electrical actuators.

During movement of the guiding structures 54 from the retracted positions into the closed positions, the lift frame 16 are forced to be pivoted in order to be aligned to the side surfaces of the load carrying object 8. The lift frame 16 pivots with reference to the connection between the attachment part 18 and the second part 12 of the moveable arm 6. In maximal retracted positions, the guiding structures 54 are essentially oriented such that the flat surfaces of the guiding structures are in, or in a plane parallel to, a plane defined by the plane of the lift frame, or alternatively further opened in a direction towards the vehicle. In the closed positions the guiding structures 54 are essentially oriented such that the flat surfaces of the guiding structures are in, or in a plane parallel to, a plane defined by the plane of the side surfaces of the load carrying object 8. Thus, the movement range of each of the guiding structures are approximately 90 degrees, or in an alternative embodiment between 90 and 180 degrees. In an exemplary variation, a maximal open angle is only approximately 54 degrees.

The important aspect is to open the guiding structures so much, that they do not collide with load carrying object during approach. Thus, the guiding structures need to opens just enough to get behind the contact surface. In that case the load carrying object can never hit the guiding structures despite how tilted it is. In some cases, it might be enough to open the guiding structures less, to get enough space for the tilt, but they could also work as a guiding surface to align the lift frame already during approaching.

According to an embodiment, the guiding structures 54 have flat surfaces, and have extensions perpendicular to the axes P in the range of 0.3-0.5 meters, and parallel to the axes P in the range of 0.3-0.7 meters.

In the figures one exemplary shape of the guiding structure is shown. In this example, the guiding structure have an essentially rectangular shape provided with one outer edge being parallel to axis P, an upper edge and a lower edge being perpendicular to the axis P, running from the outer edge towards axis P, and then narrowing to the pivoting axis. Other shapes are naturally also possible, e.g. semi-circular, semi-elliptical, or quadratic.

The guiding structures may be operated by hydraulic cylinders, or electrical actuators.

According to another embodiment, the guiding structures 54 are arranged at a lower half of said lift frame 16. And in a further embodiment, the guiding structures 54 are arranged essentially at a same level as the attachment part 18.

According to still another embodiment, the guiding structures 54 are arranged in the vicinity of the lower connectors

24. This embodiment is illustrated in FIGS. 3 and 4. Preferably, when the guiding structures 54 are arranged in the vicinity of the lower connectors, they are provided with openings through which the lower connectors 24 attach to the load carrying object 8.

Regarding the vertical positioning of the guiding structures, when the guiding structures are in a low position, it will be advantageous when applied to CX containers as more space are available. The reason is that the height of the lowest CX container can be 1.3 meter or even less, the top of the container is even below the attachment part 18. So, if the alignment procedure described herein should be applied on these low containers, the guiding structures must be in a low vertical position.

If the guiding structures are in some higher position close to the attachment part, it will probably have better aligning ability, as the guiding structures just need to rotate the lift frame around the gripping bar which acts as a pivot point. But then the CX container handling might not be possible.

According to another embodiment, the control unit 36 is configured to automatically initiate the alignment procedure when the sensor system 34 detects that the lift frame 16 approaches a load carrying object 8. The lift frame 16 approaches the load carrying object 8 when a measured distance to the load carrying object 8 is less than a pre-defined activation threshold. The predefined activation threshold may be chosen in dependence of the maximal extension of the guiding structure which is in the range of 0.3-0.5 meters.

In a further embodiment, the alignment procedure is part of a loading sequence. The alignment procedure is normally followed by an attachment procedure applied to attach the lift frame to the load carrying object, which in turn also may be a part of a loading sequence.

According to another embodiment, when the alignment procedure has been completed, the control unit 36 is then configured to initiate an attachment procedure, comprising:

attaching the upper connectors to the load carrying object 8;

changing the positions of the upper connectors 20 along movement axes M until the lower connectors 24 are in positions to be attached to the load carrying object 8, and attaching the lower connectors 24 to the load carrying object 8.

In one variation, the second end 12 is provided with a hook, and the attachment part 18 is a bar, and the lift frame 16 is arranged to be stowed at the vehicle 4 during transport, or when the hook is used to load a load carrying object 8 to the vehicle. In another variation, compatible with the earlier described embodiments and variations of the invention, the lift frame 16 has preferably the shape of the letter "H" (see e.g. FIG. 3) with two vertical side structures that the set of actuators 44 that is configured to change the positions of the upper connectors may be mounted to. A structure connecting, or linking, these two vertical side structures is further part of the lift frame in the H-shaped embodiment. The attachment part 18 may further be arranged at this connecting, or linking, structure in this embodiment. The H-shape is hence advantageous in that it provides a structure and symmetry of the lift frame that results in a natural horizontal levelling when the lift frame is hanging free at the second end 12 of the movable arm. The vertical side structures may further be arranged to at least partly cover and protect the actuators 44. Thus, the lift frame, as illustrated in FIG. 3 has essentially the shape of the capital letter H.

With references to FIGS. 5-7 an alignment procedure followed by an attachment procedure of a tilted load carrying object will now be described in detail.

In FIGS. 5-7, the lift frame assembly is shown from the vehicle, and for sake of simplicity the movable arm is not shown. As described above the movable arm is attached to the lift frame via the attachment part 18.

FIG. 5 shows the initial part of the alignment procedure where the lift frame is slowly moved by the vehicle towards the load carrying object 8, which is in a slightly tilted position in relation to the lift frame, i.e. in the tilted position. In that position it is not possible to attached the lift frame connectors to the connectors of the load carrying object. This slow movement is performed when the load carrying object is still in the tilted position, until the flat surface of the lift frame is slightly leaning against the front end of the load carrying object. During this initial part of the alignment procedure, the guiding structures 54 are in their retracted positions as shown in FIG. 5.

Then, with reference to FIG. 5, the control unit 36 is configured, in response of a manually or automatically generated alignment command 56 (see FIG. 2), during a lift frame alignment procedure, to generate an alignment control signal 52 to move the guiding structures 54 from the retracted positions into the closed positions where the guiding structures 54 are in contact with the side surfaces of the load carrying object 8. During movement of the guiding structures 54 from the retracted positions into the closed positions, the lift frame 16 are forced to be pivoted in relation to the movement arm at the attachment part 18, in order to be aligned to the side surfaces of the load carrying object 8.

FIG. 6 shows the lift frame when the guiding structures 54 are in their closed positions and the lift frame is aligned to the load carrying object 8. Thereafter, as shown in FIG. 7, the lift frame is slid downwards by movement performed by the movable arm and the connectors 22, 24 of the lift frame are then in positions to be attached to the connectors of the load carrying object during an attachment procedure.

The alignment procedure illustrated in FIGS. 5-7 is advantageous, as the lift frame in an initial stage, manually or automatically, may approach the load carrying object irrespectively of the relative orientation of the lift frame in relation to the load carrying object, and then, by performing the alignment as described, the manual intervention in the alignment procedure is considerably reduced, as an operator can perform the operation from inside the cab of the vehicle. The described alignment procedure is also a presumption for a partly or wholly autonomous alignment procedure.

Figure 9:
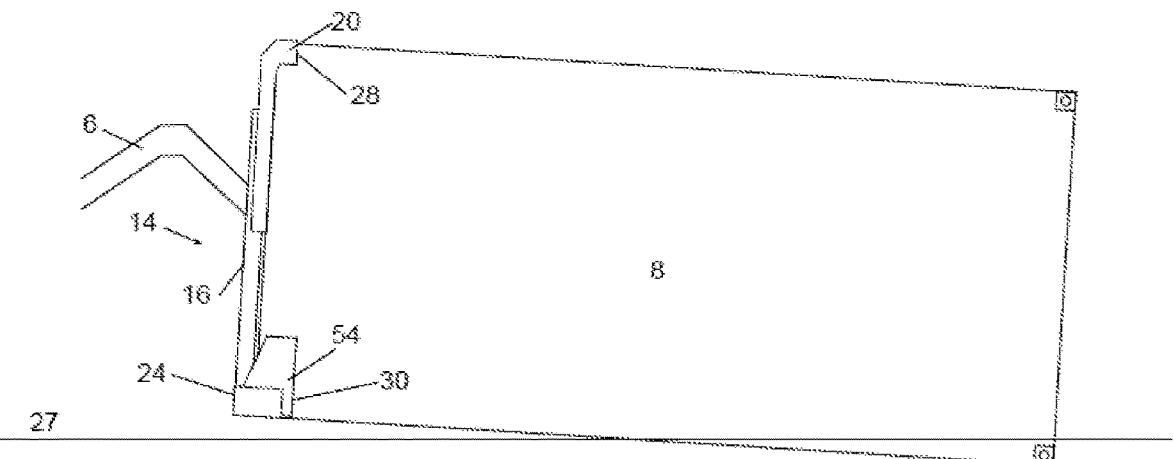

FIGS. 8 and 9 shows an alignment procedure applied together with an attachment procedure when attaching the lift frame to a load carrying object 8 where the lower part 30 of the load carrying object is inaccessible, in this case below ground level 27.

According to the embodiment applied in FIGS. 8 and 9, the control unit 36 is configured to control the set of actuators 44 to lift the load carrying object 8 by only the upper connectors 20 attached to the load carrying object 8 during an attachment procedure. This is in particular applicable in cases where the lower part 30 of the load carrying object 8 is inaccessible, e.g. the lower part of the load carrying object is covered by snow or has sunk down into the ground 27, or when the load carrying object 8 is in a tilted position. Before attaching the upper connectors, an alignment procedure has been applied by setting the guiding structures 54 into their closed positions.

Thus, in FIG. 8 the lower part of the load carrying object is inaccessible. The upper connectors 20 are attached to the upper part of the load carrying object 8, and the load carrying object is then lifted by using only the upper connectors 20 until the lower part of the load carrying object is accessible. During this lifting, the guiding structures 54 keep the load carrying object 8 in an aligned position in relation to the lift frame which is important in order to correctly position the lower connectors to the lower part of the load carrying object 8. Then the lower connectors may be attached to the lower part 30, which is illustrated in FIG. 9.

Any single or combination of the alignment procedure and attachment procedures described in the various embodiments may further be implemented as alignment and attachment procedures for a single piece of working equipment. Which attachment/alignment procedure to be applied may be controlled through input from an operator of the equipment or based on analysis of sensor signals from the sensor system. As an example, sensors detecting and/or monitoring the environment and working area for the load handling, such as a camera or a LIDAR, may be used to detect and identify the load carrying object 8 and the situation for this load carrying object (if it is tilted, submerged in to the ground, etc.) and an alignment/attachment procedure may be suggested or chosen based on this in a semi-autonomously, or fully autonomously, manner.

The present invention is not limited to the above-described preferred embodiments. Various alternatives, and modifications may be used. Therefore, the above embodiments should not be taken as limiting the scope of the invention, which is defined by the appending claims.

The invention claimed is:

1. A working equipment arranged to be mounted to a vehicle, the working equipment comprising:
   a movable arm for loading and unloading a load carrying object to/from said vehicle, wherein the movable arm has a first end connected to said vehicle and a second end arranged to connect the movable arm to the load carrying object during the loading or unloading;
   a lift frame assembly comprising a lift frame with an attachment part arranged to be attached to the second end of the movable arm, a pair of upper connectors mounted at opposite sides of an upper part of the lift frame, and a pair of lower connectors mounted at opposite sides of a lower part of the lift frame, wherein said pairs of upper and lower connectors are adapted to attach said upper and lower parts of the lift frame to a corresponding upper part and lower part, respectively, of the load carrying object;
   an actuator system, arranged to operate movements of the working equipment;
   a sensor system, arranged to monitor the movements of the working equipment, and
   a control unit configured to generate control instructions to control the operation of the actuator system in response to a loading/unloading command for the loading and/or unloading of the load carrying object and sensor signals received from the sensor system,
   wherein the lift frame assembly further comprises a set of pivotable guiding structures arranged at opposite sides of the lift frame, wherein said guiding structures are pivotable about pivoting axes P close to the opposite sides of the lift frame, and that the control unit is further configured, during a lift frame alignment procedure, to generate an alignment control signal to move the guiding structures from retracted positions into closed positions where the guiding structures are in contact with vertical side surfaces of the load carrying object, wherein, during movement of the guiding structures from the retracted positions into the closed positions, the lift frame are forced to be pivoted in order to be aligned to the side surfaces of the load carrying object.

2. The working equipment according to claim 1, wherein said guiding structures have flat surfaces, and have extensions perpendicular to the axes in the range of 0.3-0.5 meters, and parallel to the axes in the range of 0.3-0.7 meters.

3. The working equipment according to claim 1, wherein said guiding structures are arranged at a lower half of said lift frame.

4. The working equipment according to claim 1, wherein said guiding structures are arranged at a same level as said attachment part.

5. The working equipment according to claim 1, wherein said guiding structures are arranged in the vicinity of said lower connectors.

6. The working equipment according to claim 5, wherein said guiding structures are provided with openings through which the lower connectors attach to the load carrying object.

7. The working equipment according to claim 1, wherein said control unit is configured to automatically initiate said alignment procedure when said sensor system detects that said lift frame approaches a load carrying object, wherein said lift frame approaches the load carrying object when a measured distance to the load carrying object is less than a predefined activation threshold.

8. The working equipment according to claim 1, wherein said alignment procedure is part of a loading sequence.

9. The working equipment according to claim 1, wherein said pivoting axes P are parallel to a symmetry axis S of the lift frame, and wherein said symmetry axis S is parallel to the opposite sides of the lift frame and in a plane defined by the upper and lower parts of the lift frame.

10. The working equipment according to claim 1, wherein when said alignment procedure has been completed, said control unit is then configured to initiate an attachment procedure, comprising:
   attaching the upper connectors to the load carrying object;
   changing the positions of the upper connectors along movement axes M until the lower connectors are in positions to be attached to the load carrying object, and
   attaching the lower connectors to the load carrying object.

* * * * *